UNITED STATES PATENT OFFICE.

WAITSTILL H. SWENARTON, OF MONTCLAIR, NEW JERSEY.

DECOMPOSITION OF REFRACTORY ALKALI-METAL-BEARING AND ALUMINIFEROUS MINERALS.

1,277,773.     Specification of Letters Patent.     Patented Sept. 3, 1918.

No Drawing.     Application filed March 23, 1912. Serial No. 685,840.

*To all whom it may concern:*

Be it known that I, WAITSTILL H. SWENARTON, of Montclair, in the county of Essex and State of New Jersey, have invented new and useful Improvements in Decomposition of Refractory Alkali-Metal-Bearing and Aluminiferous Minerals, of which the following is a specification.

This invention relates to decomposition of refractory minerals, and particularly aluminiferous alkali metal silicates, such as feldspar, and aluminum compounds producible therefrom, such as alum, aluminum chlorid and the like.

In the production of potash from native minerals such as orthoclase, *i. e.*, potash-feldspar (which approximates the formula $KAlSi_3O_8$), and from alunite, (which closely resembles potash alum in composition, but contains a relatively larger proportion of alumina than common potash alum) it is essential that the utmost economy be practised in such processing thereof in order to render it possible to profitably obtain the potash ($K_2O$) and aluminum compounds in an available condition therefrom. In fact when working on the requisite scale, which is required to obtain substantial quantities of potash for commercial purposes, the by-products are produced in enormous quantities and by various methods which have been heretofore proposed many of such by-products are practically worthless, owing to the fact that such enormous amounts of the same are produced which amounts are far in excess of the entire consumptive demand therefor.

My invention has for its objects the simplification of the process of decomposing such minerals and the reduction of the number of by-products so obtained to a minimum amount, as well as the recovery, as far as possible, of the materials employed for re-use in subsequent operations.

As applied to alkali bearing silicates such as potash-feldspar or orthoclase, my process is carried out as follows:—

One hundred parts of finely pulverized potash feldspar (preferably ground to 150 to 200 mesh), containing preferably about 14% or more of potash ($K_2O$), is intimately mixed with 100 parts of finely powdered pearl-ash, (*i. e.*, potassium carbonate), and then fused in a suitable furnace. The foregoing proportions are based upon 100% potassium carbonate and obviously if the carbonate employed is of a lower degree of purity, a correspondingly increased quantity is employed, although it is not absolutely essential to employ the aforesaid quantity. Preferably the temperature of the material is maintained just high enough, preferably between brilliant red (800° C.) and bright orange (1200° C.) heat, to maintain the mixture in a state of fusion or incipient fusion for a sufficient length of time to complete the necessary reaction between the feldspar and the flux employed, for example, $\frac{3}{4}$ to $1\frac{1}{4}$ hours. The converted mass is then removed from the furnace, preferably pulverized to about 75 mesh size, and then digested with approximately ten volumes of water, preferably hot water maintained at or near the boiling point.

After digesting with water as aforesaid, the mass is preferably actively boiled until noticeable decomposition occurs, and the mass is broken down into what is believed to be normal acid-soluble, double, potassium aluminum silicate and a solution consisting of the original potash solution and the surplus silica originally existing in the feldspar. Whether this is the actual reaction which occurs is unimportant, but the heating should preferably be continued until the mass is thoroughly disintegrated and has become completely decomposed by the alkali present to the greatest extent it is capable of. This decomposition into an acid-soluble double silicate is indicated by the sudden swelling and thickening of the precipitate, and its suspension throughout the entire body of the liquid as distinguished from the heavy sediment originally introduced into the digesting water. In order to reduce to a minimum the amount of acid required to subsequently decompose the compound obtained by such violent boiling, which is preferably continued for a period of 30 minutes, the mixture is then filtered, and thereby it is possible to recover a large portion, if not all the original flux in a caustic state. Any silica dissolved therein is then precipitated therefrom by concentrating and then carbonating the filtrate so obtained until a suitable test indicates that no more precipitate forms and the caustic liquid has been completely converted into the carbonate. This carbonated mixture is filtered, to separate the precipitated silica or other compound which separates therefrom upon concentration of the liquid, and the filtrate is then evaporated to dryness. If there is any deficiency in the flux so recovered from the amount originally employed, it can be supplemented by the addition thereto of the amount required to make up the equivalent of 100 parts of flux of 100% purity. If on the other hand it is found that the dried residue of carbonate so obtained is in excess of the amount of carbonate originally employed, owing to the presence therein of a portion of the potash contained in the feldspar treated, the surplus over the equivalent of the amount originally employed can be reserved for sale, as such, or for conversion into any desired salt by neutralizing with sulfuric or hydrochloric acid or other desired acids, and the remainder can be employed as above stated in subsequent operations.

The precipitate obtained after filtering off the caustic liquid from the lixiviated and boiled mixture, which precipitate consists apparently of an acid-soluble silicate easily decomposed by boiling with strong mineral acids, is preferably boiled with sufficient concentrated sulfuric or hydrochloric acid to slightly acidify the mixture, and then, after digesting at a boiling temperature for a short period, the same is highly diluted and neutralized either with a portion of the clear alkali liquid reserved for the purpose, or with a small amount of ammonia, so that the mixture is just a trifle alkaline. This causes complete precipitation of the alumina and silica. Accordingly the solution is then filtered and the filtrate will contain substantially all of the remainder of the original potash in the feldspar in the form of a salt corresponding to the acid employed. The filtrate is then slightly acidified in order to facilitate crystallization, and if necessary evaporated to dryness to render any dissolved silica insoluble, and then the liquid is concentrated and allowed to crystallize, or if the same has contained silica as aforesaid, the residue is taken up with a small amount of a strong acid preferably, then diluted with water, and filtered and the filtrate concentrated and allowed to crystallize.

The alumina contained in the precipitate as aforesaid, which is combined with precipitated silica, but apparently exists merely in physical combination therewith and not chemically united therewith, is obtained from this mixture by dissolving the same with the necessary amount of hydrochloric acid required to satisfy the alumina radical, *i. e.*, corresponding to the formula

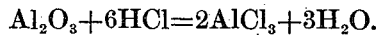

$$Al_2O_3 + 6HCl = 2AlCl_3 + 3H_2O.$$

The solution so obtained is filtered and the filtrate evaporated to dryness to render any possible dissolved silica insoluble, and the residue is taken up with a strong hydrochloric acid, then diluted with water and filtered to remove such insoluble silica. Then this practically pure aluminum chlorid is evaporated to dryness and in both instances the vapors of hydrochloric acid evolved in the evaporation of such aluminum chlorid are recovered in any suitable manner. The dry residue is then heated in a current of steam, preferably between a dull red and a bright red or yellow heat, but in any event to a sufficiently high temperature to completely decompose this aluminum chlorid into aluminum oxid and hydrochloric acid vapors. The vapors aforesaid of hydrochloric acid which are evolved are recovered for use in a subsequent operation. This decomposition is found to be equally as complete as is the decomposition of magnesium chlorid into magnesium oxid and hydrochloric acid when similarly treated, the latter process being often commercially practised, and as a result it is possible to economically recover alumina from feldspar and from its mixtures with silica aforesaid in a substantially pure condition and suitable for many purposes.

Instead of filtering off the surplus alkali which is obtained after the first lixiviation and boiling of the mass, I have discovered that the economical recovery of potash from this solution can be accomplished by neutralizing this surplus alkali with aluminum sulfate or preferably with potash alum until the solution is just slightly acidified. The alum is preferably obtained by the suitable treatment of alunite in the well known manner for example, as described on pp. 59–61 of Bulletin 551 relating to alunite published, 1912 by the U. S. Geological Survey. In this manner it is possible to utilize large quantities of alum which would otherwise be practically unsalable. After boiling the acidified mixture so obtained the same is neutralized in the manner previously described until the same is just a trifle alkaline, and then the mixture is filtered as previously described and the filtrate containing potassium sulfate is acidified, concentrated and allowed to crystallize. Obviously, if desired, the amount of alum added may be insufficient to completely neutralize the alkali and the same may be supplemented by the addition of a strong mineral acid such as sulfuric acid, until the solution is clearly acid, as shown by suitable tests. The precipitate containing alumina and silica, is treated as previously described to recover the aluminum as oxid or sulfate of aluminum is recovered if preferred.

Preferably the fusion when conducted in large masses is continued until every portion thereof has been treated sufficiently long to admit of the flux reacting with the feldspar and destroying the original identity and structure of said feldspar, the same usually being indicated by a formation of a glass-like mass and requiring from 15 minutes to an hour, depending upon the temperature and thickness of the layer of the materials treated above the furnace bed. If a furnace having an endless conveyer forming the bottom thereof is employed, it is possible to quickly fuse the mass during its travel from the inlet to the outlet of such furnace, provided a sufficiently hot flame is caused to play thereon. Under many conditions of operation, I may employ a gas or fuel-oil furnace, although, as stated, if water power is available the electric type of furnace, and preferably the so-called radiant type of electric furnace, is preferably employed.

In order to clearly complete the decomposition, and I do not restrict my invention as hereinafter claimed to the use of at least this 100% of pearl-ash, the fusion is preferably carried out in a furnace in which the bed of the same is maintained as hot, and preferably hotter than the portions of the furnace above the layer of the mineral when on said bed, as otherwise, owing to the relatively poor heat conductivity of feldspar mixture the necessary degree of fusion is difficult to obtain unless the material is rapidly turned over by mechanical means or otherwise. If water power is available I prefer to employ an electric furnace having preferably carbon electrodes, and preferably an alternating current, although a direct current or if desired suitable metal electrodes may be employed, as the temperature at which the fusion occurs is sufficiently low, not exceeding 1200° C. to preclude any possibility of electrolysis of the material treated.

The invention as herein described obviously covers the employment of various alkali metal bearing silicates and alunite or similar materials, and the claims are intentionally drawn to cover in their broadest aspect the various equivalents which they may properly be construed to include.

While it is preferable to maintain as low a temperature in the furnace as is compatible with effective decomposition, it is obvious that if any of the materials treated are volatilized the same may be recovered by suitable dust collectors arranged in the outlet flue of the furnace. The material so recovered may be treated to recover the potassium compounds or other valuable products contained therein.

While preferably I employ 100% of flux any amount in excess of 25% by weight of the mineral treated and less than 200% may be employed, provided the amount is sufficient to accomplish the incipient fusion and effective decomposition and destruction of the identity of the original feldspar.

Having thus described my invention, what I claim and desire to secure by Letters Patent is:—

1. In the decomposition of alkali, aluminum-bearing silicates, the steps which consist in reacting upon refractory, potash-bearing, silicious, aluminiferous minerals in order to recover the alkali, alumina and silica separately therefrom, with a sufficient amount of an alkali flux and at least 40% by weight to materially decompose the mixture and at a temperature sufficiently high to effect at least incipient fusion thereof; then decomposing the resultant mass with water, removing the precipitate obtained, then decomposing the said precipitate with a compound having an acid reaction, then filtering the mixture so obtained while in such a condition as to effect the precipitation of substantially all of the silicon and aluminum compounds simultaneously, then recovering a compound of potassium from the filtrate.

2. In the process of obtaining potash from native minerals, the steps which consist in reacting upon the products, obtained by fusion of potash feldspar with a large amount of an alkaline flux sufficient to effect substantially complete decomposition thereof and a subsequent lixiviation thereof with water, with sufficient alum-containing material to substantially decompose the said product and neutralize the excess of alkali, and then separating the aluminum compounds and the silicon compounds simultaneously from said mixture by filtering the same while in a substantially neutral condition.

3. In the process of recovering potash, the steps which consist in treating the product obtained by the fusion of potash feldspar with relatively large amounts of an alkali flux from 40% to 175% by weight and a subsequent lixiviation thereof with water and then adding sufficient aluminum-sulfate-containing solution to substantially neutralize the surplus alkali; then rendering the mixture sufficiently neutral to effect the precipitation of substantially all of the alumina and silica therein.

4. In the decomposition of potash-bearing silicates the process which consists in reacting upon refractory, potash-bearing, silicious minerals with a sufficient amount of an alkali flux and at a sufficiently high temperature to materially decompose said mixture into acid-soluble, potassium silicate and silica; then lixiviating said mixture with water, removing the insoluble matter, then decomposing said insoluble matter with a compound having an acid reaction, then filtering said resulting mixture while substantially neutral and in such a condition as to effect the precipitation simultaneously of silica and alumina, and then recovering the potassium compound from the filtrate.

5. In the decomposition of alkali-bearing silicates containing relatively large percentage of silica and alumina, the process which consists in reacting upon refractory, potash-bearing silicious minerals with a sufficient amount of potash flux, at least 40% by weight, and at a sufficiently high temperature, to materially decompose said mixture into acid-soluble, potassium silicate and silica; then lixivating said mixture with water, removing the precipitate obtained, then decomposing said precipitate with a compound having an acid reaction, then filtering said resulting mixture while substantially neutral and in such a condition as to effect the precipitation simultaneously of silica and alumina, and then recovering the potassium compound from the filtrate.

6. In the process of treating potash-bearing feldspar, the steps which consist in adding an acid to a strong alkaline solution containing alumina and silica, and then filtering said solution while sufficiently approaching its neutral point to permit of the separation of substantially all of the alumina and a large part of the silica by simultaneous precipitation thereof.

7. The process of treating refractory potash-bearing silicious minerals in order to recover the alkali and alumina separately therefrom, which consists in first finely subdividing the same and fusing with an alkali-metal flux in excess of 40% and less than 200% by weight of the mineral treated, for a sufficient period and at a sufficiently high temperature to effect substantial decomposition of said mineral; then digesting said mass in a finely divided condition in an aqueous solution and at an elevated temperature, then separating the insoluble material from said resultant mixture and rendering the same substantially neutral but still slightly alkaline, then filtering off the insoluble precipitate and then recovering the potassium salt from the resulting filtrate.

8. In the process of treating feldspar, the steps which consist in fusing the same with an alkali-metal flux in excess of 40% and less than 200% by weight of the mineral treated, and then recovering a potassium compound from the decomposed mass by subjecting the water-insoluble portion of the same to a secondary decomposition with an acid in an amount sufficient to satisfy the alkali-metal oxid radical of any alkali-metal compound contained in said mass and insufficient to materially satisfy the aluminum oxid radical of any aluminum compound contained in said mass, then separating the insoluble precipitate thereby produced and treating the filtrate to obtain the resultant potassium salt.

9. In the process of treating feldspar, the steps which consist in fusing the same with an alkali metal flux in excess of 75% and less than 125% by weight of the mineral treated, and then recovering a potassium salt from the decomposed mass by subjecting the water-insoluble portion of the same to a secondary decomposition with an acid, then while the mass is still alkaline, separating the insoluble precipitate thereby produced and treating the filtrate to obtain the resultant potassium salt.

10. In the process of treating refractory potash-bearing feldspar in order to recover the potash and alumina separately therefrom, the steps which consist in heating said mineral while in a finely subdivided condition with from 75% to 125%, by weight of the mineral treated, of a water-soluble, alkaline, oxygen compound of an alkali-metal for a sufficient period and at a sufficiently high temperature, not less than a bright red heat, to effect substantial decomposition of said mineral and to thereby render the potash and alumina contained therein soluble in a mineral acid, removing the heated mass from the influence of said heat, digesting the resultant mass with a relatively large volume of water for a sufficient time to dissolve the water-soluble alkali compounds therefrom, and then filtering off the water-insoluble alkali compounds.

In witness whereof I have hereunto set my hand at the city, county and State of New York, this 22nd day of March, 1912.

WAITSTILL H. SWENARTON.

Witnesses:
 CLARENCE J. WYCKOFF,
 L. E. JOHNSTON.